(No Model.)

R. M. HUNTER.
REGULATION OF ALTERNATING GENERATORS.

No. 540,668. Patented June 11, 1895.

Attest
Wm. L. Evans
H. L. Motherwell

Inventor

UNITED STATES PATENT OFFICE.

RUDOLPH M. HUNTER, OF PHILADELPHIA, PENNSYLVANIA.

REGULATION OF ALTERNATING GENERATORS.

SPECIFICATION forming part of Letters Patent No. 540,668, dated June 11, 1895.

Application filed June 21, 1894. Serial No. 515,286. (No model.)

*To all whom it may concern:*

Be it known that I, RUDOLPH M. HUNTER, of the city and county of Philadelphia and State of Pennsylvania, have invented an Improvement in Apparatus for Generation and Regulation of Alternating Currents of Electricity, of which the following is a specification.

My invention has reference to apparatus and method for the generation and regulation of alternating currents of electricity, and consists of certain improvements which are fully set forth in the following specification and shown in the accompanying drawings which form a part thereof.

This application, Case No. 277, has particular reference to the means for controlling the current output of an alternating current generator, and for maintaining the potential.

My invention comprehends certain improvements in the use of a counter electro motive force independent of the generating plant proper, as a means for regulating the strength of the field magnets of the alternating current generator, and will be better understood by reference to the accompanying drawings, in which—

Figure 1:
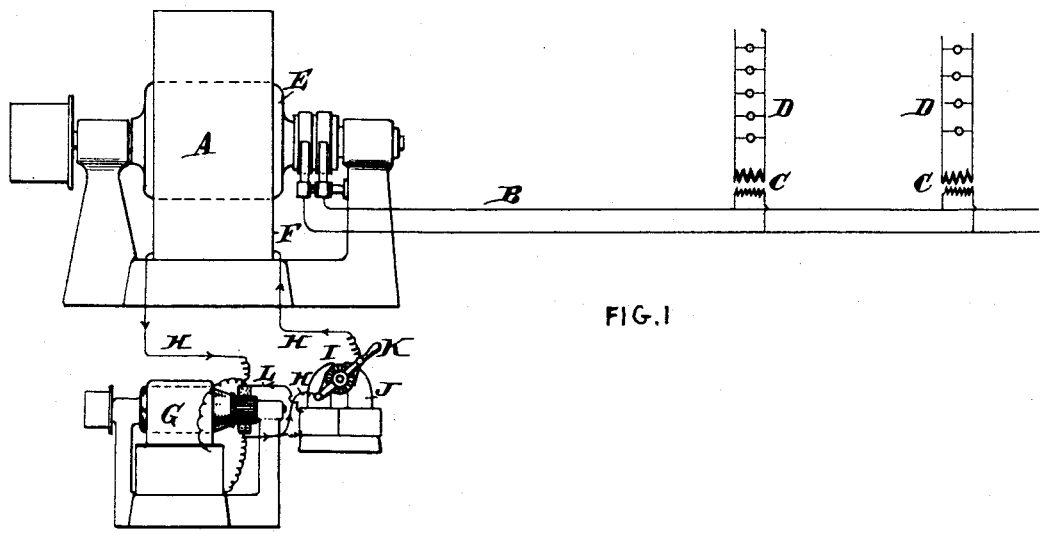
Figure 2:
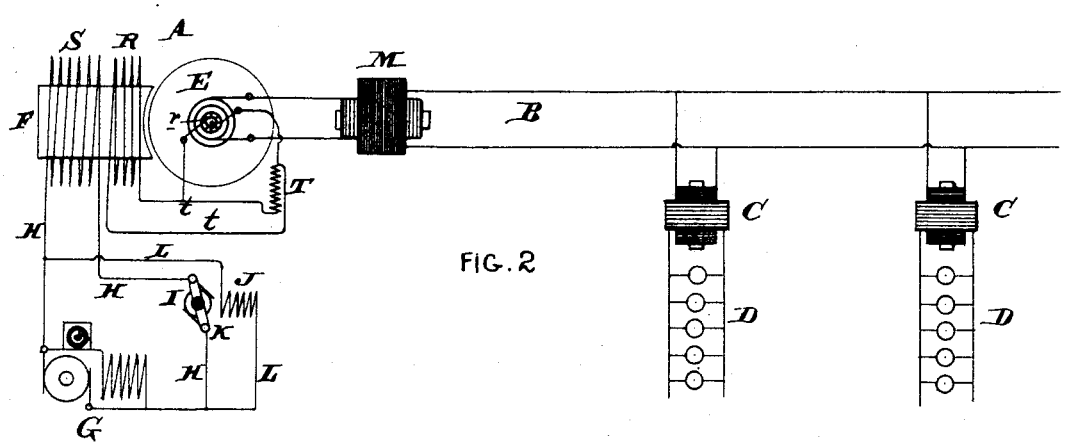

Figure 1 is an elevation illustrating my improvements as applied to an ordinary separately-excited alternating dynamo-electric machine, and Fig. 2 is a diagram illustrating my improvements applied to a self-exciting alternating-current generator.

A is the alternating current generator proper. E is its armature. F represents its field magnets.

B is the line circuit.

C, C are converters arranged parallel in the line B and supplying current of lower potential to the local circuits D, D, containing translating devices such as lamps, motors, &c.

The alternating current generator may be of any suitable construction. In the case shown in Fig. 1, this alternating current generator has its field magnets F separately excited by the dynamo electric machine G, for generating continuous currents, which currents are transmitted through the exciting circuit H to the field magnets F.

I is a counter electro motive force regulator, and consists of a revolving armature moving in a magnetic field produced by field magnets J, and having means to shift its poles relatively to the poles of the field magnets J, by the employment of adjustable brush connections K, the said brush connections being in series with the exciting circuits H. The field magnets J are energized by the current from the exciter G through the conductors L. The armature I of the counter electro motive force regulator revolves freely, and being energized by the current from the exciter G, generates a counter electro motive force which is proportionally to its winding, its speed, and the magnetic field in which it revolves. As the exciter G is a constant potential generator, the field in which the armature I revolves is substantially constant. It follows therefore, that if the brushes K are shifted, the relation of the poles of the armature of the field are correspondingly shifted, and the armature winding is caused to move through the field with a greater or less rapidity, the variation in speed being from a state of rest to a speed sufficiently great to prevent the flow of any practical current, or in other words, to generate a counter electro motive force substantially equal to the initial electro motive force or that of the generator G. By the adjustment of the brushes K, I am therefore enabled to regulate the field of the generator at will, and with the greatest nicety, overcoming all of the irregular regulation heretofore employed by the use of resistance boxes or rheostats, and also without any of the usual loss which resulted from the employment of such contrivances for choking off the current applied to the field magnets.

Referring now to Fig. 2 the alternating generator current A is of the self exciting type, that is to say, it is provided with field magnets F, having low resistance coils R in circuit with the armature through a rectifying commutator $r$. The current which does not pass through the low resistance coil R and circuits $t$, is permitted to pass through the resistances T in the usual manner. The field magnets are also provided with separately exciting coils S which receive current from a separate exciter G adapted to generate constant potential currents which are supplied to the said coils S by the circuits H. In this circuit is located a regulating armature I, the said armature being made to revolve in a magnetic field produced by field magnets J, in a shunt circuit L about the generator G. By shifting the brushes K of the regulating armatures I, we have the same action in this case as that described with reference to Fig. 1, only that in this case the device is applied to a self exciting dynamo which requires less current to regulate the field in connection with the separate exciter. As shown, the armature E is supposed to generate low potential currents, and these are converted at the generating station into high potential currents by the converter or transformer M, the said high potential current being sent over the high resistance line B, and converted at distant places into low potential currents by the converter C, C, which low potential currents are utilized to energize the translating devices in local circuits T.

I do not confine myself to the mere details of construction as they may be modified in various ways without departing from the principles of my invention.

Having now described my invention, what I claim as new, and desire to secure by Letters Patent, is—

1. The combination of an alternating current generator, line circuits leading therefrom for supplying energy to translating devices at distant places, a separate continuous current generator or exciter, an exciting circuit leading from said continuous current generator for supplying current to the field magnets of the alternating current generator, a regulating armature for generating counter electro motive force arranged in the exciting circuit, field magnets for producing a magnetic field in the vicinity of the regulating armature, and adjustable devices for shifting the poles of the regulating armature relatively to the poles of the field magnets for the purpose of varying the speed of the regulating armature and therefore the counter electro motive force.

2. The combination of an alternating current generator, line circuits leading therefrom for supplying energy to translating devices at distant places, a separate continuous current generator or exciter for generating constant potential currents, an exciting circuit leading from said continuous current generator for supplying current to the field magnets of the alternating current generator, a regulating armature for generating counter electro motive force arranged in the exciting circuit, field magnets for producing a magnetic field in the vicinity of the regulating armature, and a shunt circuit from the continuous current generator including the field magnets of the regulating armature whereby a constant or substantially constant field is maintained.

3. The combination of an alternating current generator, line circuits leading therefrom for supplying current to distant translating devices, a continuous current generator for supplying current to the field magnets of the alternating current generator, exciting circuits for connecting the continuous current generator with the field magnets of the alternating current generator, means entirely independent of the alternating current generator for producing in said exciting circuit a counter electro motive force, and means to vary the extent of the counter electro motive force for the purpose of regulating gradually the output of the alternating current generator.

In testimony of which invention I have hereunto set my hand.

R. M. HUNTER.

Witnesses:
ERNEST HOWARD HUNTER,
C. H. NEWCOMB.